(12) United States Patent
Okino et al.

(10) Patent No.: US 12,044,573 B2
(45) Date of Patent: Jul. 23, 2024

(54) FLAME DETECTION SYSTEM, REPORTING SYSTEM, FLAME DETECTION METHOD, AND NON-TRANSITORY STORAGE MEDIUM

(71) Applicant: Panasonic Intellectual Property Management Co., Ltd., Osaka (JP)

(72) Inventors: Toru Okino, Osaka (JP); Yutaka Hirose, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 933 days.

(21) Appl. No.: 17/015,603

(22) Filed: Sep. 9, 2020

(65) Prior Publication Data
US 2021/0041297 A1 Feb. 11, 2021

Related U.S. Application Data
(63) Continuation of application No. PCT/JP2019/011510, filed on Mar. 19, 2019.

(30) Foreign Application Priority Data
Mar. 20, 2018 (JP) .................................. 2018-053553

(51) Int. Cl.
*G01J 5/00* (2022.01)
(52) U.S. Cl.
CPC ..... *G01J 5/0018* (2013.01); *G01J 2005/0077* (2013.01)

(58) Field of Classification Search
CPC ............ G01J 5/0018; G01J 2005/0077; G01J 5/0014; G01J 3/027; G01J 3/2803; G01J 2003/2826; G01J 1/429; G01J 5/026; G08B 17/125
See application file for complete search history.

(56) References Cited

U.S. PATENT DOCUMENTS
2011/0181765 A1  7/2011  Nakahara

FOREIGN PATENT DOCUMENTS
| | | |
|---|---|---|
| CN | 106373320 A | 2/2017 |
| JP | 8-307757 A | 11/1996 |
| JP | H11-160158 A | 6/1999 |
| JP | 3102605 U | 7/2004 |
| JP | 2006-267097 A | 10/2006 |
| JP | 2011-151269 A | 8/2011 |
| JP | 2015-108924 A | 6/2015 |
| JP | 2017-028114 A | 2/2017 |

(Continued)

OTHER PUBLICATIONS
International Search Report w/English translation and Written Opinion in Japanese dated Jun. 4, 2019, issued in counterpart International Application No. PCT/JP2019/011510 (7 pages).

(Continued)

*Primary Examiner* — David P Porta
*Assistant Examiner* — Meenakshi S Sahu
(74) *Attorney, Agent, or Firm* — WHDA, LLP

(57) ABSTRACT

A flame detection system includes a determiner and an outputter. The determiner is configured to, when image processing performed on image data detects ultraviolet light, determine that a light emitting source is a fire flame. The outputter is configured to output a determination result by the determiner.

10 Claims, 14 Drawing Sheets

(56) References Cited

FOREIGN PATENT DOCUMENTS

WO 2016/050334 A1 4/2016

OTHER PUBLICATIONS

Office Action dated Aug. 10, 2023, issued in counterpart CN application No. 201980018742.8, with English translation. (26 pages).
Office Action dated Feb. 7, 2024, issued in counterpart CN application No. 201980018742.8, with English translation. (30 pages).

FIG. 7

| | ST101 | ST102 | ST103 | ST104 | ST105 |
|---|---|---|---|---|---|
| PATTERN 1 | D1 (image) | No | | | |
| PATTERN 2 | D1 with R1 | Yes | D2 (image) | No | DETERMINE THAT LIGHT EMITTING SOURCE IS HYDROGEN FLAME |
| PATTERN 3 | D1 with R1 | Yes | D2 with R2 | Yes | |
| PATTERN 4 | D1 with R1 | Yes | D2 with R2 | No | DETERMINE THAT LIGHT EMITTING SOURCE IS HYDROGEN FLAME |

FIG. 9

| | ST201 | ST202 | ST203 | ST204 | ST205 | ST206 | ST207 ST208 |
|---|---|---|---|---|---|---|---|
| PATTERN 1 | D1 | No | | | | | |
| PATTERN 2 | D1, R1 | Yes | D2 | No | D3 | No | DETERMINE THAT LIGHT EMITTING SOURCE IS HYDROGEN FLAME |
| PATTERN 3 | D1, R1 | Yes | D2, R2 | Yes | | | |
| PATTERN 4 | D1, R1 | Yes | D2, R2 | No | D3, R3 | Yes | DETERMINE THAT LIGHT EMITTING SOURCE IS CARBON FLAME |
| PATTERN 5 | D1, R1, R1 | Yes | D2, R2 | No | D3, R3 | No | DETERMINE THAT LIGHT EMITTING SOURCE IS HYDROGEN FLAME |

FIG. 11

| | ST301 | ST302 | ST303 | ST304 | ST305 |
|---|---|---|---|---|---|
| PATTERN 1 | D1 (only) | No | | | |
| PATTERN 2 | D1, R1 (triangle) | Yes | R1, D1 with overlapping triangles | Yes | DETERMINE THAT LIGHT EMITTING SOURCE IS HYDROGEN FLAME |
| PATTERN 3 | D1, R1 (diamond) | Yes | D1, R1 with overlapping diamonds | No | |
| PATTERN 4 | D1, R1 (triangle), R1 (diamond) | Yes | R1, D1 with overlapping triangles and diamonds, R1 | Yes | DETERMINE THAT LIGHT EMITTING SOURCE IS HYDROGEN FLAME |

FIG. 13

| | ST401 | ST402 | ST403 | ST404 | ST405 |
|---|---|---|---|---|---|
| PATTERN 1 | D1 | No | | | |
| PATTERN 2 | D1, R1 | Yes | M1 | No | DETERMINE THAT LIGHT EMITTING SOURCE IS HYDROGEN FLAME |
| PATTERN 3 | D1, R1 | Yes | M2 | Yes | |
| PATTERN 4 | D1, R1, R1 | Yes | M1, M2 | No | DETERMINE THAT LIGHT EMITTING SOURCE IS HYDROGEN FLAME |

FLAME DETECTION SYSTEM, REPORTING SYSTEM, FLAME DETECTION METHOD, AND NON-TRANSITORY STORAGE MEDIUM

CROSS-REFERENCE TO RELATED APPLICATION

The present application is based upon and claims the benefit of priority of Japanese Patent Application No. 2018-053553, filed on Mar. 20, 2018, the entire contents of which are incorporated herein by reference.

TECHNICAL FIELD

The present disclosure relates generally to flame detection systems, reporting systems, flame detection methods, and non-transitory storage media and specifically, to a flame detection system for detecting a fire flame, a reporting system, a flame detection method, and a non-transitory storage medium.

BACKGROUND ART

A flame detector configured to distinguish between a flame and artificial light is known (see, for example, JP H08-307757 A). The flame detector described in JP H08-307757 A includes an imaging optical system, an image capturing means, and a flame determination means. The image capturing means is a color TV camera for capturing images in a prescribed monitoring range by using the imaging optical system. The flame determination means binarizes a video signal from the image capturing means and determines whether or not an object is a flame based on a time sequential pattern of a binary signal thus obtained.

The flame detector (flame detection system) described in JP H08-307757 A focuses on that a flame moves from side to side, and thereby, flame detector distinguishes between the flame and artificial light. Thus, in the case of a flame (e.g., a fire flame) that does not move from side to side, the flame may not be distinguished as being a flame.

SUMMARY

It is an object of the present disclosure to provide a flame detection system, a reporting system, a flame detection method, and a non-transitory storage medium storing a computer program which are configured to improve the detection accuracy of a fire flame.

A flame detection system according to one aspect of the present disclosure includes a determiner and an outputter. The determiner is configured to, when image processing performed on image data detects ultraviolet light, determine that a light emitting source is a fire flame. The outputter is configured to output a determination result by the determiner.

A reporting system according to one aspect of the present disclosure includes the above-described flame detection system, a solid-state imaging device, and a reporting unit. The solid-state imaging device is sensitive to ultraviolet light and is configured to output the image data. The reporting unit is configured to report an abnormality in accordance with an output result from the outputter.

A flame detection system according to one aspect of the present disclosure includes a solid-state imaging device, a determiner, and an outputter. The solid-state imaging device includes first pixels and second pixels arranged in a two-dimensional grid pattern, and the second pixels are provided with filters. The determiner is configured to create first image data from first pixel information of the first pixels. The determiner is configured to create second image data from second pixel information of the second pixels. The determiner is configured to determine, based on a luminance value of each of the first image data and the second image data, that an area from which light having a first wavelength is emitted represents a fire flame. The outputter is configured to output a determination result by the determiner.

A flame detection method according to one aspect of the present disclosure includes a determination step and an output step. The determination step is a step of, when image processing performed on image data detects ultraviolet light, determining that a light emitting source is a fire flame. The output step is a step of outputting a determination result in the determination step.

A non-transitory storage medium storing a computer program according to one aspect of the present disclosure is a non-transitory storage medium storing a computer program configured to cause a computer system to execute the above-described flame detection method.

BRIEF DESCRIPTION OF THE DRAWINGS

The figures depict one or more implementation in accordance with the present teaching, by way of example only, not by way of limitations. In the figures, like reference numerals refer to the same or similar elements.

FIG. 7 is a view illustrating the first operation example of the flame detection system;

FIG. 9 is a view illustrating the second operation example of the flame detection system;

FIG. 11 is a view illustrating the third operation of the flame detection system;

FIG. 13 is a view illustrating the fourth operation example of the flame detection system.

DESCRIPTION OF EMBODIMENTS

(1) Schema

A schema of a flame detection system 1 and a reporting system 10 of the present embodiment will be described below with reference to FIG. 1.

The flame detection system 1 according to the present embodiment is a system applied to, for example, a hydrogen station, a hydrogen power generating facility, or the like and configured to detect a fire flame generated by hydrogen leakage. Moreover, the reporting system 10 according to the present embodiment is a system configured to report an abnormality (hydrogen leakage) when a fire flame is detected by the flame detection system 1.

Figure 1:
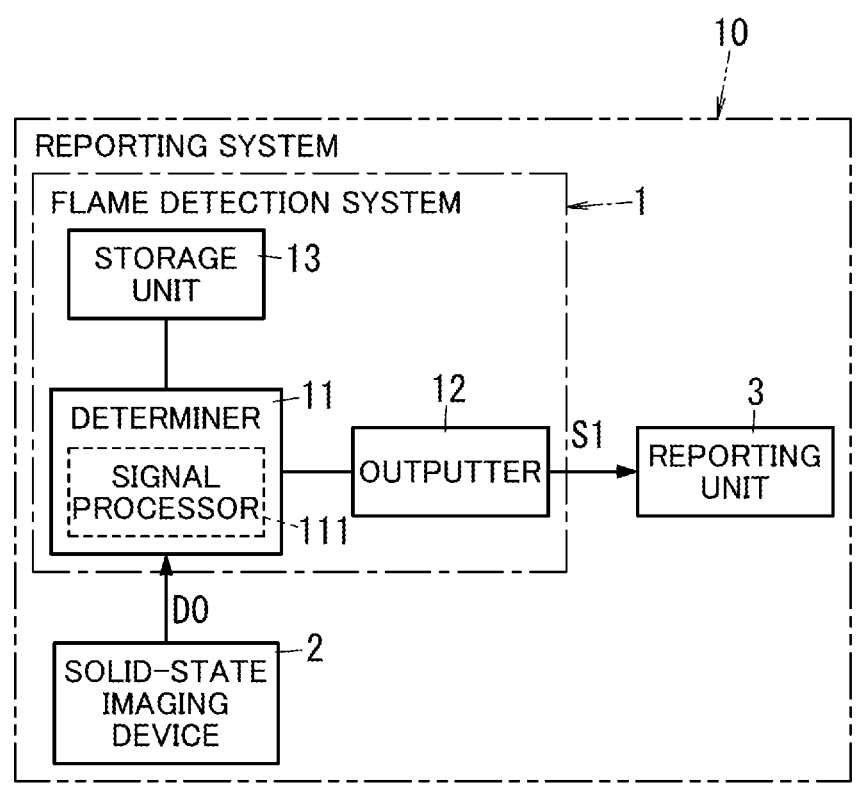
FIG. 1 is a block diagram illustrating a flame detection system and a reporting system according to one embodiment of the present disclosure.

As illustrated in FIG. 1, the flame detection system 1 according to the present embodiment includes a determiner 11 and an outputter 12. The determiner 11 determines whether or not a light emitting source is a fire flame as a sensing target based on a result from image processing performed on image data D0. In other words, when the image processing performed on the image data D0 detects ultraviolet light (light having a first wavelength), the determiner 11 determines that the light emitting source is the fire flame. In the present embodiment, the fire flame as the sensing target is a hydrogen flame. As used herein, the "hydrogen flame" is a fire flame generated by burning hydrogen, and at this time, only ultraviolet light is generated. The outputter 12 outputs a determination result by the determiner 11.

As illustrated in FIG. 1, the reporting system 10 according to the present embodiment includes the flame detection system 1, a solid-state imaging device 2, and a reporting unit 3. The solid-state imaging device 2 is sensitive to ultraviolet light (ultraviolet radiation) and outputs the image data D0 to the flame detection system 1. The reporting unit 3 reports an abnormality in accordance with an output result of the outputter 12 of the flame detection system 1. Specifically, when receiving from the outputter 12 a result representing that the hydrogen flame is detected, the reporting unit 3 reports the occurrence of the abnormality (hydrogen leakage).

According to the flame detection system 1 of the present embodiment, whether or not the light emitting source is the fire flame (hydrogen flame) is determined based on the presence or absence of the ultraviolet light in the image data D0, which enables the detection accuracy of the fire flame to be improved as compared to a case where the determination is made based on, for example, the movement of the fire flame. Moreover, the reporting system 10 according to the present embodiment enables the occurrence of the abnormality (hydrogen leakage) to be reported when the flame detection system 1 detects the fire flame.

(2) Details

Details of the flame detection system 1 and the reporting system 10 of the present embodiment will be described below with reference to FIGS. 1 to 4.

As illustrated in FIG. 1, the reporting system 10 according to the present embodiment includes the flame detection system 1, the solid-state imaging device 2, and the reporting unit 3. The reporting system 10 may further include a lens for focusing light on the solid-state imaging device 2, a filter for controlling the wavelength range of light to be incident on the solid-state imaging device 2, and the like. However, the lens has to be a lens configured to focus not only visible light but also ultraviolet light.

(2.1) Flame Detection System

As illustrated in FIG. 1, the flame detection system 1 includes the determiner 11, the outputter 12, and a storage section 13. The determiner 11 includes a signal processor 111.

The determiner 11 includes a microcomputer including a processor and memory. That is, the determiner 11 is realized by a computer system including a processor and memory. The processor executes an appropriate program, and thereby, the computer system functions as the determiner 11. The program may be stored in the memory in advance, provided via a telecommunications network such as the Internet, or provided by a non-transitory storage medium such as a memory card storing the program.

Figure 2A:
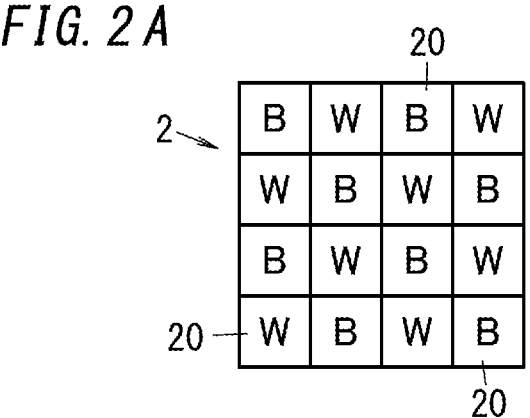
FIG. 2A is a schematic diagram illustrating an arrangement pattern of color filters of a solid-state imaging device included in the reporting system.

The signal processor 111 performs prescribed signal processing (image processing) on the image data D0 from the solid-state imaging device 2. For example, as illustrated in FIG. 2A, when the solid-state imaging device 2 include only blue color filters, the signal processor 111 creates first image data D1 and second image data D2. The first image data D1 is an image created based on pixels (pixels denoted by "W" in FIG. 2A) 20 by which ultraviolet light, blue light, green light, and red light are receivable. The second image data D2 is an image created based on pixels (pixels denoted by "B" in FIG. 2A) 20 provided with the color filters. The pixels 20 by which the ultraviolet light, blue light, green light, and red light are receivable are hereinafter also referred to as "first pixels 20". In the first image data D1, the pixels 20 provided with the color filters are interpolated based on the first pixels 20 located therearound. In the second image data D2, the first pixels 20 are interpolated based on the pixels 20 located therearound and provided with the color filters.

Figure 2B:
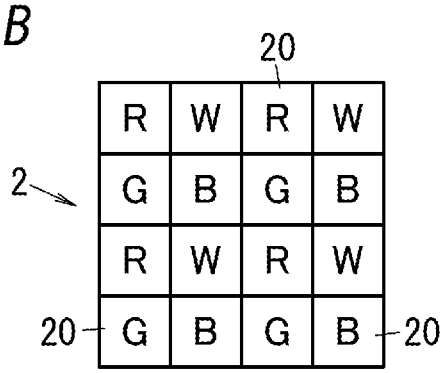
FIG. 2B is a schematic diagram illustrating another arrangement pattern of color filters of the solid-state imaging device included in the reporting system.

Alternatively, for example, when the solid-state imaging device 2 includes blue, red, and green color filters as illustrated in FIG. 2B, the signal processor 111 creates first image data D1, second image data D2, third image data D3, and fourth image data D4. The first image data D1 is an image created based on pixels (pixels denoted by "W" in FIG. 2B) 20 by which ultraviolet light, blue light, green light, and red light are receivable. The second image data D2 is an image created based on pixels (pixels denoted by "B" in FIG. 2B) 20 provided with the blue color filters. The third image data D3 is an image created based on pixels (pixels denoted by "R" in FIG. 2B) 20 provided with the red color filters. The fourth image data D4 is an image created based on pixels (pixels denoted by "G" in FIG. 2B) 20 provided with green color filters.

The determiner 11 performs a determination process based on the first image data D1 and the second image data D2 (or, first image data D1 to fourth image data D4) stored in the storage section 13. The determiner 11 distinguishes between the hydrogen flame and a light emitting source other than the hydrogen flame by the determination process. As used herein, the "light emitting source other than the hydrogen flame" includes spark discharge (e.g., lightning flash), corona discharge, a fire flame of a substance containing carbon (hereinafter also referred to as a "carbon flame"), and the like. Moreover, as used herein, the "fire flame of a substance containing carbon" refers to a fire flame generated by burning a substance containing carbon, and at this time, ultraviolet light and visible light are generated. The determiner 11 distinguishes between the hydrogen flame and the carbon flame based on the first image data D1 and at least one of the pieces of second to fourth image data D2 to D4 which corresponds to the wavelength of the carbon flame. When a light emitting source is detected in all of the first image data D1 and the at least one of the pieces of second to fourth image data D2 to D4 which corresponds to the wavelength of the carbon flame, the determiner 11 determines that the light emitting source is the carbon flame, and when the light emitting source is detected only in the first image data D1, the determiner 11 determines that the light emitting source is the hydrogen flame.

Moreover, in the case of spark discharge and corona discharge (hereinafter also referred to as "discharge"), not only ultraviolet light but also blue light is generated. The determiner 11 distinguishes the hydrogen flame and the discharge based on, for example, the first image data D1 and the second image data D2. When a light emitting source is detected in both the first image data D1 and the second image data D2, the determiner 11 determines that the light emitting source is the discharge, and when the light emitting source is detected only in the first image data D1, the determiner 11 determines that the light emitting source is the hydrogen flame. That is, when the image processing performed on the image data D0 detects light within a wavelength range different from the wavelength range of the ultraviolet light, the determiner 11 determines that the light emitting source is not the hydrogen flame (fire flame). In particular, when the hydrogen flame is distinguished from the discharge, the wavelength range different from the wavelength range of the ultraviolet light is the wavelength range of blue light. The wavelength range of the blue light is, for example, 380 nm to 400 nm.

The outputter 12 outputs the determination result by the determiner 11 to the reporting unit 3. In other words, when the determiner 11 determines that the hydrogen flame as the sensing target is detected, the outputter 12 outputs, to the reporting unit 3, a result representing that the hydrogen flame is detected. In the present embodiment, the outputter 12 outputs, to the reporting unit 3, a report instruction signal S1 for causing the reporting unit 3 to report that the hydrogen flame as the sensing target is detected.

The storage section 13 is constituted by, for example, readable/writable memory such as flash memory. The storage section 13 stores the first image data D1 and the second image data D2 (or, the first image data D1 to the fourth image data D4) created by the signal processor 111 based on the image data D0 sent from the solid-state imaging device 2.

(2.2) Solid-State Imaging Device

As illustrated in FIGS. 2A and 2B, the solid-state imaging device 2 according to the present embodiment includes the plurality of (in the example shown in the figure, 16) pixels 20 arranged in an m×n array (in the example shown in the figures, m=4 and n=4). In other words, the plurality of pixels 20 (the first pixels and second pixels) are arranged in a two-dimensional grid pattern. In FIG. 2A, the pixels 20 denoted by "W" are white, that is, the first pixels by which ultraviolet light, blue light, green light, and red light are receivable, and the pixels 20 denoted by "B" are pixels (the second pixels) provided with the color filters through which only blue light is allowed to pass. In FIG. 2B, the pixels 20 denoted by "R" are pixels provided with the color filters through which only red light is allowed to pass, and the pixels 20 denoted by "G" are pixels provided with the color filters through which only green light is allowed to pass. In FIGS. 2A and 2B, the first pixels 20 and the pixels 20 provided with the color filters are alternately arranged.

In the flame detection system 1 according to the present embodiment, at least one of the plurality of pixels 20 is preferably the pixel 20 provided with the color filter in order to distinguish between the hydrogen flame and the light emitting source other than the hydrogen flame. In particular, when the hydrogen flame is distinguished from the discharge, at least one of the plurality of pixels 20 is preferably the pixel 20 provided with the blue color filter.

Figure 3:
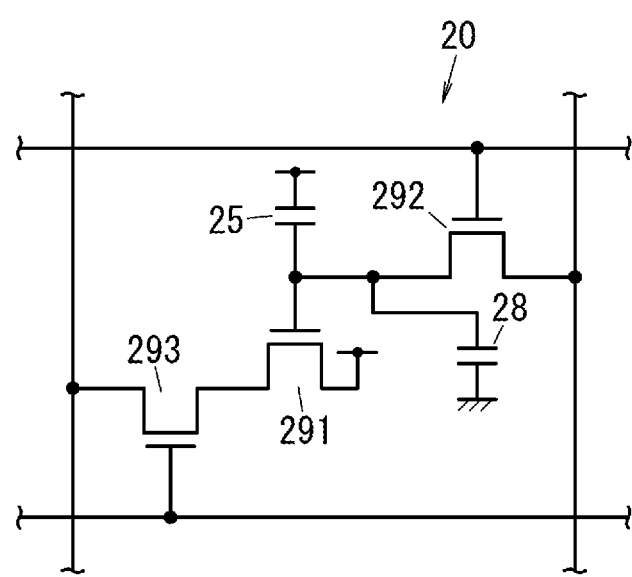
FIG. 3 is a circuit diagram illustrating one of pixels of the solid-state imaging device included in the reporting system.
Figure 4:
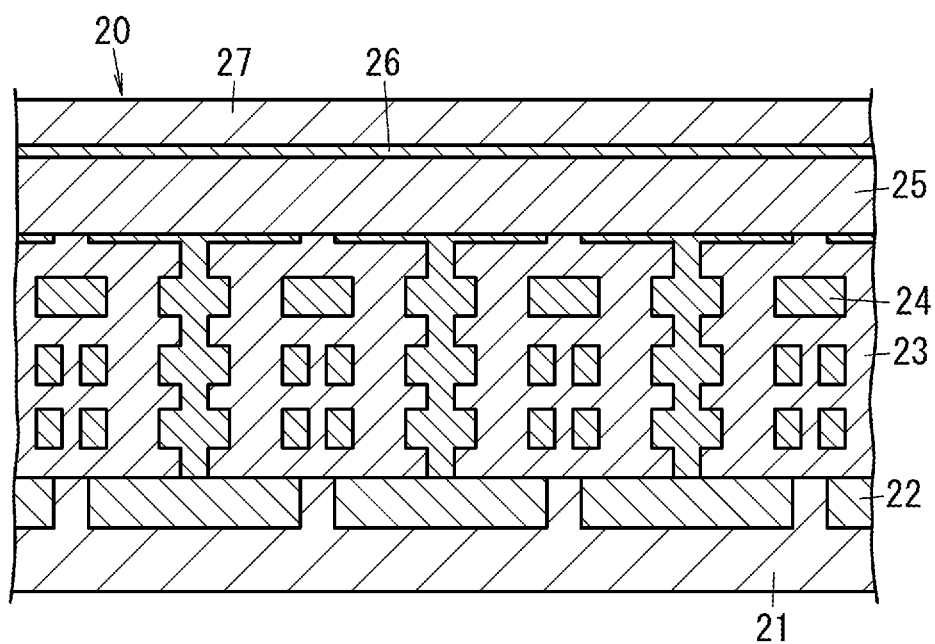
FIG. 4 is a sectional view schematically illustrating the solid-state imaging device included in the reporting system.

As illustrated in FIGS. 3 and 4, each of the plurality of pixels 20 includes a first electrode 24, a photoelectric converter 25, a second electrode 26, an electric charge accumulator 28, a first transistor 291, a second transistor 292, and a third transistor 293. Moreover, each of the plurality of pixels 20 further includes a semiconductor substrate 21, a pixel circuit 22, and a wiring layer 23. In the example shown in FIG. 4, three pixel circuits 22 are mounted on the semiconductor substrate 21.

The first electrode (lower electrode) 24 is made of, for example, a material such as aluminum (Al), copper (Cu), titanium nitride (TiN), or the like suitable for semiconductor fabrication processes. The first electrode 24 is electrically connected via the wiring layer 23 to the electric charge accumulator 28 provided in the pixel circuit 22.

The photoelectric converter 25 is, for example, an organic film sensitive to ultraviolet light. The organic film is sensitive to not only the ultraviolet light but also visible light. The photoelectric converter 25 is located on the first electrode 24. The photoelectric converter 25 converts light into an electric signal. Materials for the photoelectric converter 25 are not limited to the organic film but may be, for example, materials such as silicon, aluminum gallium nitride (AlGaN), and diamond which are sensitive to ultraviolet light.

The second electrode (upper electrode) 26 is, for example, a transparent electrode made of indium tin oxide (ITO), zinc oxide (ZnO), or the like. The second electrode 26 is located on the photoelectric converter 25.

The protection film 27 is made of, for example, silicon nitride, silicon oxynitride, or the like.

The electric charge accumulator 28 is provided in the pixel circuit 22. The electric charge accumulator 28 accumulates electric charges generated by the photoelectric converter 25. The electric charge accumulator 28 is, for example, P-N junction capacitance.

The first transistor (source follower transistor) 291 outputs a source voltage as a signal when the electric charges accumulated in the electric charge accumulator 28 are applied to the gate of the first transistor. The second transistor (reset transistor) 292 erases (resets) the electric charges accumulated in the electric charge accumulator 28 from the electric charge accumulator 28. The third transistor (selection transistor) 293 selects any pixel 20 from the plurality of pixels 20.

Next, operation of the solid-state imaging device 2 will be briefly described. Light passing through the protection film 27 and the second electrode 26 are converted through photoelectric conversion performed by the photoelectric converter 25 into an electric charge (electric signal). The electric charge obtained by the conversion performed by the photoelectric converter 25 is accumulated in the electric charge accumulator 28. The electric charge accumulated in the electric charge accumulator 28 is applied to the gate of the first transistor 291, and the source voltage of the first transistor 291 is output as a signal. Moreover, the electric charge accumulated in the electric charge accumulator 28 is erased by the second transistor 292 from the electric charge accumulator 28.

In a circuit configuration of a general solid-state imaging device, an electric charge is lost from the electric charge accumulator when data is read out during accumulation of the electric charge. However, in a circuit configuration of the solid-state imaging device 2 according to the present embodiment, data is readable without losing an electric charge accumulated in the electric charge accumulator 28.

That is, the circuit configuration of the solid-state imaging device 2 according to the present embodiment enables non-destructive readout in which data (a signal) is read without destroying the electric charge accumulated in the electric charge accumulator 28.

Figure 5:
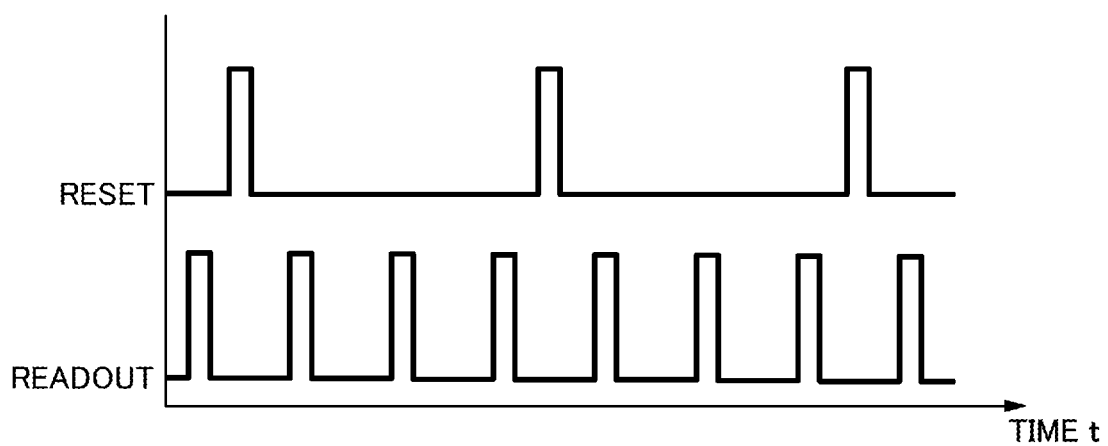
FIG. 5 is a timing chart of the solid-state imaging device included in the reporting system.

As illustrated in FIG. 5, in the solid-state imaging device 2 according to the present embodiment, the first transistor 291 causes the electric charge accumulator 28 to output a signal electric charge three times before the second transistor 292 resets (erases) the electric charge in the electric charge accumulator 28 (i.e., during one electric charge accumulation time period). According to this method, while accumulation of electric charges in the electric charge accumulator 28 continues, data is readable during the accumulation. Therefore, this method provides the advantage that even when the signal electric charge is very small, the signal becomes easily recognizable by accumulating the signal electric charge for a long period of time. Moreover, the advantage that data read out during the accumulation enables early determination.

(2.3) Reporting Unit

The reporting unit 3 is configured to report an abnormality in accordance with the output result of the outputter 12 of the flame detection system 1. Specifically, when the determiner 11 determines that the hydrogen flame as the sensing target is detected, the reporting unit 3 reports the occurrence of an abnormality (hydrogen leakage). The reporting unit 3 includes a monitor (display device) installed in, for example, a hydrogen station. The reporting unit 3 causes the monitor to display a message saying, for example, "an abnormality occurred" based on the report instruction signal S1 from the outputter 12. In this case, the reporting unit 3 may be configured to not only display the message on the monitor but also report the occurrence of the abnormality by a sound (voice, buzzer, or the like). Moreover, in this case, for example, the reporting unit 3 may be configured to notify a management company of the hydrogen station of the occurrence of the abnormality.

(3) Operation

Operation of the flame detection system 1 of the present embodiment will be described below.

(3.1) First Operation Example

Figure 6:
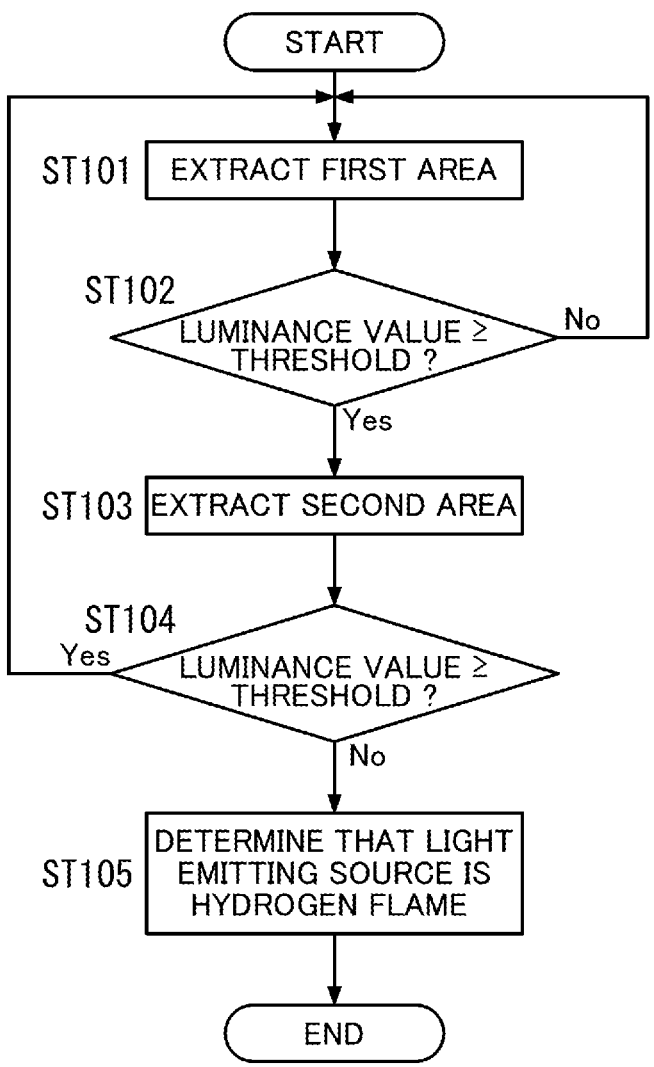
FIG. 6 is a flowchart of a first operation example of the flame detection system.

A first operation example of the flame detection system 1 according to the present embodiment will be described with reference to FIGS. 6 and 7. In the first operation example, a case where a hydrogen flame is distinguished from discharge will be described. In this case, the solid-state imaging device 2 includes blue color filters as illustrated in FIG. 2A.

In FIG. 7, "pattern 1" shows a case where neither the hydrogen flame nor the discharge is detected. In FIG. 7, "pattern 2" shows a case where the hydrogen flame is detected. In FIG. 7, "pattern 3" shows a case where the discharge is detected. In FIG. 7, "pattern 4" shows a case where both the hydrogen flame and the discharge are detected. Note that shapes of the hydrogen flame and the discharge in FIG. 7 schematically represent the hydrogen flame and the discharge and are different from actual shapes.

The determiner 11 reads first image data D1 from the storage section 13. The signal processor 111 extracts a first area R1 based on the first image data D1 (step ST101). At this time, the signal processor 111 compares the luminance value of each pixel 20 in the first image data D1 with a threshold prescribed and extracts, as the first area R1, an area in which the luminance value is larger than or equal to the threshold (step ST102). If the first area R1 is not extracted (step ST102; No), the determiner 11 determines that neither the hydrogen flame nor the discharge exists, and the determiner 11 repeats steps ST101 and ST102. That is, this case corresponds to "pattern 1" in FIG. 7.

If the first area R1 is extracted (step ST102; Yes), the determiner 11 reads second image data D2 from the storage section 13. The signal processor 111 extracts a second area R2 based on the second image data D2 (step ST103). As used herein, the "second area R2" is an area which is in the second image data D2, which is the same as the first area R1, and in which the luminance value of each pixel 20 is larger than or equal to the threshold. That is, the signal processor 111 performs a comparison between the threshold and each luminance value in the area which is in the second image data D2 and which is the same as the first area R1, and the signal processor 111 extracts, as the second area R2, the area in which each luminance value is larger than or equal to the threshold (step ST104).

If the second area R2 is extracted (step ST104; Yes), the determiner 11 determines that a light emitting source is the discharge, and the operation returns to step ST101. This case corresponds to "pattern 3" in FIG. 7. That is, when the light emitting source is the discharge, blue light is included, and since this blue light passes through the blue color filters, the blue light is extracted as the second area R2 in the second image data D2.

If the second area R2 is not extracted (step ST104; No), the determiner 11 determines that the light emitting source is the hydrogen flame (step ST105). This case corresponds to "pattern 2" and "pattern 4" in FIG. 7. That is, when the light emitting source is the hydrogen flame, only ultraviolet light exists, but this ultraviolet light is absorbed by the blue color filters and is thus not extracted as the second area R2 in the second image data D2.

When the determiner 11 determines that the light emitting source is the hydrogen flame, the determiner 11 causes the outputter 12 to output the report instruction signal S1. Then, the reporting unit 3 of the reporting system 10 receives the report instruction signal S1 from the outputter 12 and reports the occurrence of an abnormality (hydrogen leakage). In this case, the monitor of the reporting unit 3 may be caused to display the first image data D1 and the second image data D2.

This method enables the hydrogen flame to be distinguished from the discharge and thus reduces troubles, for example, stopping of a facility such as the hydrogen station due to erroneous detection.

(3.2) Second Operation Example

Figure 8:
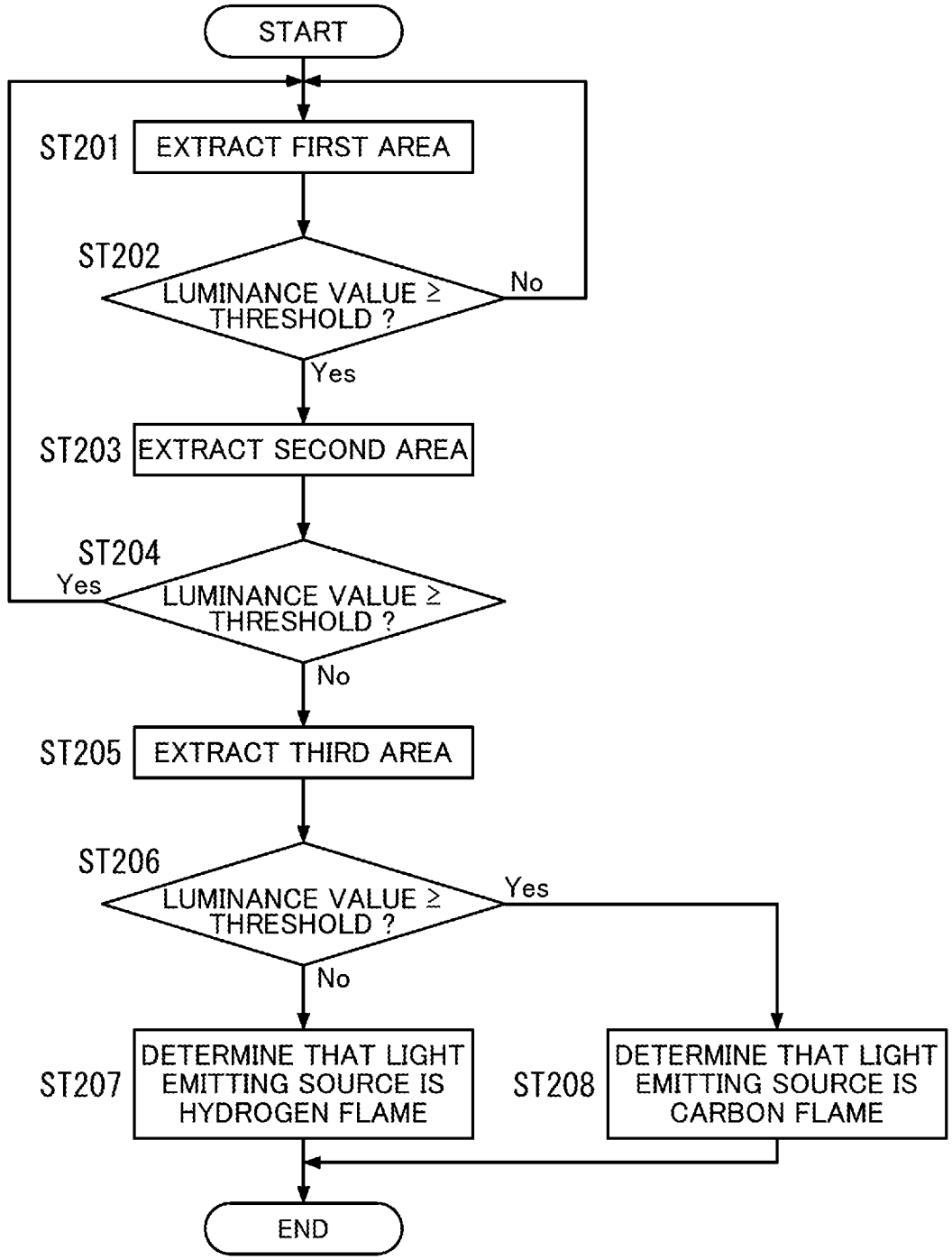
FIG. 8 is a flowchart illustrating a second operation example of the flame detection system.

A second operation example of the flame detection system 1 according to the present embodiment will be described with reference to FIGS. 8 and 9. In the second operation example, a case where a hydrogen flame, discharge, and a carbon flame (e.g., a fire flame which emits red light) are distinguished from one another will be described. In this case, the solid-state imaging device 2 includes blue, red, and green color filters as illustrated in FIG. 2B.

In FIG. 9, "pattern 1" shows a case where none of the hydrogen flame, the discharge, and the carbon flame is detected. In FIG. 9, "pattern 2" shows a case where the hydrogen flame is detected. In FIG. 9, "pattern 3" shows a case where the discharge is detected. In FIG. 9, "pattern 4" shows a case where the carbon flame is detected. In FIG. 9, "pattern 5" shows a case where all of the hydrogen flame, the discharge, and the carbon flame are detected. Note that shapes of the hydrogen flame, the discharge, and the carbon flame in FIG. 9 schematically represent the hydrogen flame, the discharge, and the carbon flame and are different from actual shapes.

The determiner 11 reads first image data D1 from the storage section 13. The signal processor 111 extracts a first area R1 based on the first image data D1 (step ST201). At this time, the signal processor 111 compares the luminance value of each pixel 20 in the first image data D1 with a threshold prescribed and extracts, as the first area R1, an area in which the luminance value is larger than or equal to the threshold (step ST202). If the first area R1 is not extracted (step ST202; No), the determiner 11 determines that none of the hydrogen flame, the discharge, and the carbon flame exists, and the determiner 11 repeats steps ST201 and ST202. This case corresponds to "pattern 1" in FIG. 9.

If the first area R1 is extracted (step ST202; Yes), the determiner 11 reads second image data D2 from the storage section 13. The signal processor 111 extracts a second area R2 based on the second image data D2 (step ST203). The signal processor 111 performs a comparison between the threshold and each luminance value in an area which is in the second image data D2 and which is the same as the first area R1, and the signal processor 111 extracts, as the second area R2, the area in which each luminance value is larger than or equal to the threshold (step ST204).

If the second area R2 is extracted (step ST204; Yes), the determiner 11 determines that a light emitting source is the discharge, and the operation returns to step ST201. This case corresponds to "pattern 3" in FIG. 9. That is, when the light emitting source is the discharge, blue light is included, and since this blue light passes through the blue color filters, the blue light is extracted as the second area R2 in the second image data D2.

If the second area R2 is not extracted (step ST204; No), the determiner 11 reads third image data D3 from the storage section 13. The signal processor 111 extracts a third area R3 based on the third image data D3 (step ST205). The signal processor 111 performs a comparison between the threshold and each luminance value in an area which is in the third image data D3 and which is the same as the first area R1, and the signal processor 111 extracts, as the third area R3, an area in which each luminance value is larger than or equal to the threshold (step ST206).

If the third area R3 is extracted (step ST206; Yes), the determiner 11 determines that the light emitting source is the carbon flame, and the operation returns to step ST208. This case corresponds to "pattern 4" in FIG. 9. That is, when the light emitting source is the carbon flame, red light is included, and since this red light passes through the red color filters, the red light is extracted as the third area R3 in the third image data D3.

If the third area R3 is not extracted (step ST206; No), the determiner 11 determines that the light emitting source is the hydrogen flame (step ST207). This case corresponds to "pattern 2" and "pattern 5" in FIG. 9. That is, when the light emitting source is the hydrogen flame, only ultraviolet light exists, but this ultraviolet light is absorbed by the red color filters and is thus not extracted as the third area R3 in the third image data D3.

When the determiner 11 determines that the light emitting source is the hydrogen flame, the determiner 11 causes the outputter 12 to output the report instruction signal S1. Then, the reporting unit 3 of the reporting system 10 receives the report instruction signal S1 from the outputter 12 and reports the occurrence of an abnormality (hydrogen leakage). In this case, the monitor of the reporting unit 3 may be caused to display the first image data D1, the second image data D2, and the third image data D3.

This method enables the hydrogen flame, the discharge, and the carbon flame to be distinguished among one another and thus reduces troubles, for example, stopping of a facility such as the hydrogen station due to erroneous detection.

Note that as illustrated in the second operation example, a general flame ("flame of a substance containing carbon") emits red light, and the red light passes through the red color filters. Thus, when the spectrum of an object causing erroneous detection is known in advance, the characteristic of the filter mounted on each pixel is changed in accordance with the spectrum, which provides the advantage that the shape of the area is more easily recognized.

(3.3) Third Operation Example

Figure 10:
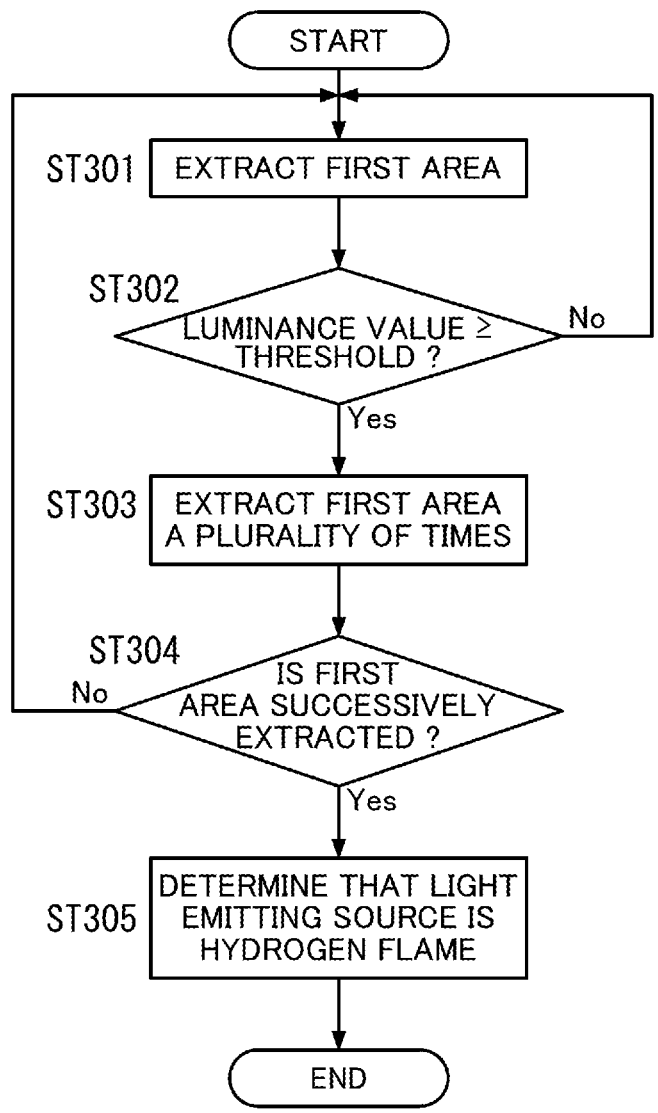
FIG. 10 is a flowchart of a third operation example of the flame detection system.

A third operation example of the flame detection system 1 according to the present embodiment will be described with reference to FIGS. 10 and 11. In the third operation example, a case where a hydrogen flame is distinguished from discharge will be described. In this case, the solid-state imaging device 2 includes blue color filters as illustrated in FIG. 2A.

In FIG. 11, "pattern 1" shows a case where neither the hydrogen flame nor the discharge is detected. In FIG. 11, "pattern 2" shows a case where the hydrogen flame is detected. In FIG. 11, "pattern 3" shows a case where the discharge is detected. In FIG. 11, "pattern 4" shows a case where both the hydrogen flame and the discharge are detected. Note that shapes of the hydrogen flame and the discharge in FIG. 11 schematically represent the hydrogen flame and the discharge and are different from actual shapes.

The determiner 11 reads first image data D1 from the storage section 13. The signal processor 111 extracts a first area R1 based on the first image data D1 (step ST301). At this time, the signal processor 111 compares the luminance value of each pixel 20 in the first image data D1 with a threshold prescribed and extracts, as the first area R1, an area in which the luminance value is larger than or equal to the threshold (step ST302). If the first area R1 is not extracted (step ST302; No), the determiner 11 determines that neither the hydrogen flame nor the discharge exists, and the determiner 11 repeats steps ST301 and ST302. This case corresponds to "pattern 1" in FIG. 11.

If the first area R1 is extracted (step ST302; Yes), the determiner 11 extracts the first area R1 in each of a plurality of (in the example shown in the figure, three) pieces of first image data D1 which are successive in time sequence (step ST303). In other words, the determiner 11 determines whether or not a light emitting source is the fire flame based on a plurality of pieces of image data D0 obtained in time sequence. Since light is emitted non-continuously in the case of the light emitting source being the discharge, the determiner 11 determines that the light emitting source is the discharge when the first area R1 is not successively detected in time sequence (step ST304; No), and the operation returns to step ST301. This case corresponds to "pattern 3" in FIG. 11.

Since light is emitted continuously in the case of the light emitting source being the hydrogen flame, the determiner 11 determines that the light emitting source is the hydrogen flame (step ST305) when the first area R1 is successively detected in time series (step ST304; Yes). In other words, when the image processing performed on the plurality of pieces of image data D0 successively detects ultraviolet light, the determiner 11 determines that the light emitting source is the fire flame. This case corresponds to "pattern 2" and "pattern 4" in FIG. 11.

When the determiner 11 determines that the light emitting source is the hydrogen flame, the determiner 11 causes the outputter 12 to output the report instruction signal S1. Then, the reporting unit 3 of the reporting system 10 receives the report instruction signal S1 from the outputter 12 and reports the occurrence of an abnormality (hydrogen leakage). In this case, the monitor of the reporting unit 3 may be caused to display the first image data D1, the second image data D2, and the third image data D3.

This method enables the hydrogen flame to be distinguished from the discharge and thus reduces troubles, for example, stopping of a facility such as the hydrogen station due to erroneous detection.

(3.4) Fourth Operation Example

Figure 12:
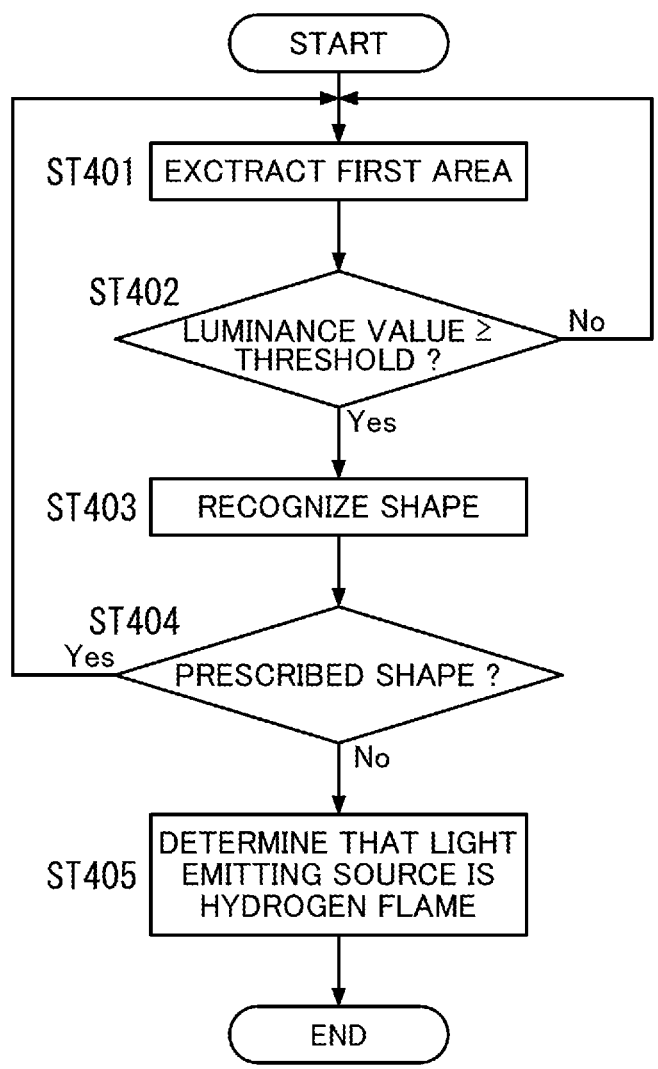
FIG. 12 is a flowchart of a fourth operation example of the flame detection system.

A fourth operation example of the flame detection system 1 according to the present embodiment will be described with reference to FIGS. 12 and 13. In the fourth operation example, a case where a hydrogen flame is distinguished from discharge will be described. In this case, the solid-state imaging device 2 includes blue color filters as illustrated in FIG. 2A.

In FIG. 13, "pattern 1" shows a case where neither the hydrogen flame nor the discharge is detected. In FIG. 13, "pattern 2" shows a case where the hydrogen flame is detected. In FIG. 13, "pattern 3" shows a case where the discharge is detected. In FIG. 13, "pattern 4" shows a case where both the hydrogen flame and the discharge are detected.

The determiner 11 reads first image data D1 from the storage section 13. The signal processor 111 extracts a first area R1 based on the first image data D1 (step ST401). At this time, the signal processor 111 compares the luminance value of each pixel 20 in the first image data D1 with a threshold prescribed and extracts, as the first area R1, an area in which the luminance value is larger than or equal to the threshold (step ST402). If the first area R1 is not extracted (step ST402; No), the determiner 11 determines that neither the hydrogen flame nor the discharge exists, and the determiner 11 repeats steps ST401 and ST402. This case corresponds to "pattern 1" in FIG. 13.

If the first area R1 is extracted (step ST402; Yes), the determiner 11 causes the signal processor 111 to recognize the shape of the first area R1 (step ST403). Here, in the case of the light emitting source being the hydrogen flame, hydrogen ignites due to frictional heating caused when a hydrogen gas is ejected from a leak spot formed in a high-pressure tubing, which results in a rectangular (trapezoidal) fire flame shape having two sides which face each other and which differ from each other by 10% or more in length (hereinafter referred to as a "first shape M1"). In contrast, when the light emitting source is the discharge, this results in a linear fire flame shape or a rectangular fire flame shape having two sides which face each other and which differ from each other by less than 10% in length (hereinafter referred to as a "second shape M2").

If the shape of the first area R1 is the second shape M2 (step ST404; Yes), the determiner 11 determines that the light emitting source is the discharge, and the operation returns to step ST401. This case corresponds to "pattern 3" in FIG. 11.

If the shape of the first area R1 is the first shape M1 (step ST404; No), the determiner 11 determines that the light emitting source is the hydrogen flame (step ST405). This case corresponds to "pattern 2" and "pattern 4" in FIG. 11. In other words, the determiner 11 determines whether or not the light emitting source is the fire flame based on the shape of an ultraviolet light area detected by the image processing.

When the determiner 11 determines that the light emitting source is the hydrogen flame, the determiner 11 causes the outputter 12 to output the report instruction signal S1 Then, the reporting unit 3 of the reporting system 10 receives the report instruction signal S1 from the outputter 12 and reports the occurrence of an abnormality (hydrogen leakage). In this case, the monitor of the reporting unit 3 may be caused to display the first image data D1 and the second image data D2.

This method enables the hydrogen flame to be distinguished from the discharge and thus reduces troubles, for example, stopping of a facility such as the hydrogen station due to erroneous detection.

(4) Variation

The above-described embodiment is a mere example of various embodiments of the present disclosure. Various modifications may be made to the above-described embodiment depending on design and the like as long as the object of the present disclosure can be achieved. Moreover, functions similar to those of the flame detection system 1 may be realized by a flame detection method, a computer program, a non-transitory storage medium storing a computer program, or the like.

A flame detection method according to one aspect includes a determination step and an output step. The determination step is a step of, when image processing performed on image data D0 detects ultraviolet light, determining that a light emitting source is a fire flame. The output step is a step of outputting a determination result in the determination step.

A program according to one aspect is a program configured to cause a computer system to execute the above-described flame detection method. The program may be stored in a non-transitory storage medium.

Variations of the above-described embodiment will be described below. Note that any of the variations to be described below may be combined as appropriate.

The flame detection system 1 or a subject that executes the flame detection method of the present disclosure includes a computer system. The computer system includes, as hardware, a processor and memory. The functions of the flame detection system 1 or the subject that executes the flame detection method of the present disclosure may be performed by making the processor execute a program stored in the memory of the computer system. The program may be stored in the memory of the computer system in advance or may be provided over telecommunications network. Alternatively, the program may also be distributed after having been recorded in some non-transitory storage medium such as a memory card, an optical disc, or a hard disk drive, any of which is readable for the computer system. The processor of the computer system includes one or more electronic circuits including a semiconductor integrated circuit (IC) or a large-scale integrated circuit (LSI). The plurality of electronic circuits may be collected on one chip or may be distributed on a plurality of chips. The plurality of chips may be integrated together in a single device or distributed in multiple devices without limitation.

The function of the determiner 11 (including the signal processor 111) of the flame detection system 1 may be provided in a single device or may be distributed in multiple devices. Still alternatively, at least some functions of the determiner 11 may be implemented as a cloud computing system as well.

In the above-described embodiment, an example in which a fire flame is the hydrogen flame is shown, but the fire flame is not limited to the hydrogen flame but may be another fire flame as long as it is a fire flame emitting light. For example, in the case of a general flame, an emission spectrum differs between burning in the presence of sufficient oxygen (complete burning) and burning in the presence of insufficient oxygen (unburning) (the emission spectrum is blue during the complete burning and red during the unburning). As described above, adapting the characteristic of the filter in each case to the emission spectrum of the complete burning or the unburning enables the hydrogen flame, the discharge, and the carbon flame to be distinguished from one another but also burning states of a carbon flame (general fire flame) to be distinguished from each other.

The above-described embodiment uses the color filters through each of which only specified light is allowed to pass, but, for example, an image data in a state where no light is emitted from a light emitting source may be defined as a reference data, and a filter function may be realized based on a difference from the reference data. In this case, a filter (UV filter, RGB filter, or the like) for identifying the light emitting source may be omitted.

For example, when the hydrogen flame is distinguished from the discharge, light within a wave length range longer than the wave length range of blue light included in the discharge is not necessary, and therefore, the solid-state imaging device 2 may be provided with a filter configured to block the light within the wavelength range longer than the wave length of the blue light.

In the above-described embodiment, an example has been described in which the solid-state imaging device 2 includes the pixels 20 provided with the color filters and pixels 20 by which ultraviolet light, blue light, green light, and red light are receivable. In contrast, the solid-state imaging device 2 may include, for example, the pixels 20 provided with the color filters and pixels on which UV filters transmissive to only ultraviolet light are mounted.

Figure 14:
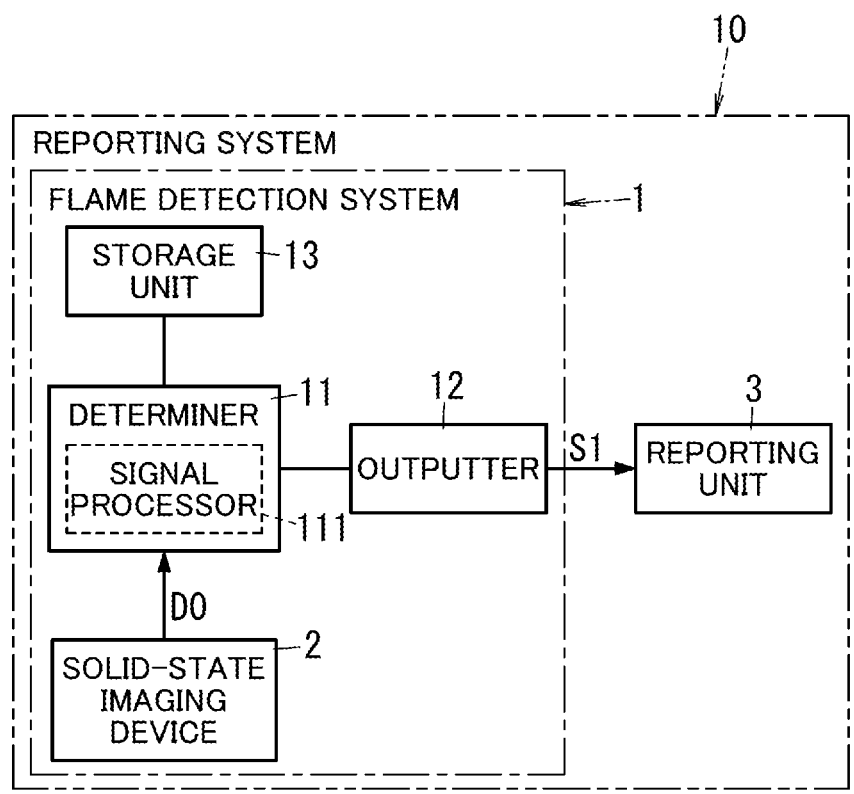
FIG. 14 is a block diagram illustrating a flame detection system and a reporting system according to a variation of the one embodiment of the present disclosure.

In the above-described embodiment, the solid-state imaging device 2 is included in the reporting system 10, but the solid-state imaging device 2 may be included in the flame detection system 1 as illustrated in FIG. 14. In other words, the flame detection system 1 may include the solid-state imaging device 2, the determiner 11, and the outputter 12.

SUMMARY

As described above, a flame detection system (1) of the first aspect includes a determiner (11) and an outputter (12). The determiner (11) is configured to, when image processing performed on image data (D0) detects ultraviolet light, determine that a light emitting source is a fire flame. The outputter (12) is configured to output a determination result by the determiner (11).

This aspect determines whether or not the light emitting source is the fire flame based on the presence or absence of the ultraviolet light in the image data (D0), which enables the detection accuracy of the fire flame to be improved as compared to a case where the determination is made based on, for example, the movement of the fire flame.

In a flame detection system (1) of a second aspect referring to the first aspect, the determiner (11) is configured to, when the image processing detects light within a wavelength range different from a wavelength range of the ultraviolet light, determine that the light emitting source is not the fire flame.

This aspect enables the fire flame and a light emitting source other than the fire flame to be distinguished from each other.

In a flame detection system (1) of a third aspect referring to the second aspect, the wavelength range of the light is a wavelength range of blue light.

This aspect enables the fire flame and an ultraviolet light emitting source such as the discharge (including lightning flash) to be distinguished from each other.

In a flame detection system (1) of a fourth aspect referring to any one of the first to third aspects, the determiner (11) determines whether or not the light emitting source is the fire flame based on a plurality of pieces of image data (D0) obtained in time sequence.

This aspect further improves the detection accuracy of a fire flame as compared to a case where determination is made based on one image data.

In a flame detection system (1) of a fifth aspect referring to the fourth aspect, the determiner (11) is configured to, when the image processing performed on the plurality of pieces of image data (D0) successively detects the ultraviolet light, determine that the light emitting source is the fire flame.

This aspect enables ultraviolet light to be consecutively detected in time sequence when a fire flame includes the ultraviolet light and thus enables the accuracy of distinguishing between the fire flame and the ultraviolet light emitting source other than the fire flame to be improved.

In a flame detection system (1) of a sixth aspect referring to any one of the first to fifth aspects, the determiner (11) is configured to determine whether or not the light emitting source is the fire flame based on a shape (a first shape M1, a second shape M2) of an ultraviolet light area (a first area R1) detected by the image processing.

With this aspect, whether or not the light emitting source is the fire flame is determined based on the shape of the ultraviolet light.

A reporting system (10) according to a seventh aspect includes the flame detection system (1) of any one of the first to sixth aspects, a solid-state imaging device (2), and a reporting unit (3). The solid-state imaging device (2) is sensitive to ultraviolet light and is configured to output the image data (D0). The reporting unit (3) is configured to report an abnormality in accordance with an output result of the outputter (12).

This aspect enables the occurrence of the abnormality to be reported when the flame detection system (1) detects the fire flame.

In a reporting system (10) according to an eighth aspect referring to the seventh aspect, the solid-state imaging device (2) includes a plurality of pixels (20) arranged in an array. Each of the plurality of pixels (20) includes a first electrode (24), a photoelectric converter (25), an electric charge accumulator (28), a second electrode (26), a first transistor (291), a second transistor (292), and a third transistor (293). The photoelectric converter (25) is located on the first electrode (24) and is configured to convert light into an electric signal. The electric charge accumulator (28) is electrically connected to the first electrode (24) and is configured to accumulate an electric charge generated by the photoelectric converter (25). The second electrode (26) is located on the photoelectric converter (25). The first transistor (291) is configured to cause the electric charge accumulator (28) to output the electric charge accumulated in the electric charge accumulator (28). The second transistor (292) erases the electric charge accumulated in the electric charge accumulator (28) from the electric charge accumulator (28). The third transistor (293) selects any pixel (20) from the plurality of pixels (20). The photoelectric converter (25) is an organic film.

This aspect enables the occurrence of the abnormality to be reported when the flame detection system (1) detects the fire flame.

A flame detection method according to a ninth aspect includes a determination step and an output step. The determination step is a step of, when image processing performed on image data (D0) detects ultraviolet light, determining that a light emitting source is a fire flame. The output step is a step of outputting a determination result in the determination step.

This aspect enables the detection accuracy of the fire flame to be improved.

A non-transitory storage medium according to a tenth aspect is a non-transitory storage medium storing a computer program configured to cause a computer system to execute the flame detection method of the ninth aspect.

This aspect enables the detection accuracy of the fire flame to be improved.

A flame detection system (1) of an eleventh aspect includes a solid-state imaging device (2), a determiner (11), and an outputter (12). The solid-state imaging device (2) includes first pixels (20) and second pixels (20) arranged in a two-dimensional grid pattern and the second pixels (20) are provided with filters. The determiner (11) is configured to create first image data (D1) from first pixel information of the first pixels (20). The determiner (11) is configured to create second image data (D2) from second pixel information of the second pixels (20). The determiner (11) is configured to determine, based on a luminance value of each of the first image data (D1) and the second image data (D2), that an area from which light having a first wavelength is emitted represents a fire flame. The outputter (12) is configured to output a determination result by the determiner (11).

With this aspect, whether or not the light emitting source is the fire flame is determined based on the luminance value of each of the first image data (D1) and the second image data (D2).

The configurations according to the second to sixth aspects are not configurations essential for the flame detection system (1) and may accordingly be omitted.

The configuration according to the eighth aspect is not a configuration essential for the reporting system (10) and may accordingly be omitted.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A flame detection system, comprising:
a determiner configured to, when image processing performed on image data detects ultraviolet light, determine that a light emitting source is a fire flame; and
an outputter configured to output a determination result by the determiner,
wherein the determiner is configured to, when the image processing detects light within a wavelength range different from a wavelength range of the ultraviolet light, determine that the light emitting source is not the fire flame.

2. The flame detection system of claim 1, wherein the wavelength range of the light is a wavelength range of blue light.

3. The flame detection system according to claim 1, wherein
the determiner determines whether or not the light emitting source is the fire flame based on a plurality of pieces of image data obtained in time sequence.

4. The flame detection system of claim 3, wherein
the determiner is configured to, when the image processing performed on the plurality of pieces of image data successively detects the ultraviolet light, determine that the light emitting source is the fire flame.

5. The flame detection system according to claim 1, wherein
the determiner is configured to determine whether or not the light emitting source is the fire flame based on a shape of an ultraviolet light area detected by the image processing.

6. A reporting system, comprising:
the flame detection system according to claim 1;
a solid-state imaging device sensitive to ultraviolet light and configured to output the image data; and
a reporting unit configured to report an abnormality in accordance with an output result of the outputter.

7. The reporting system of claim 6, wherein
the solid-state imaging device includes a plurality of pixels arranged in an array, each of the plurality of pixels includes
a first electrode,
a photoelectric converter located on the first electrode and configured to convert light into an electric signal,
an electric charge accumulator electrically connected to the first electrode and configured to accumulate an electric charge generated by the photoelectric converter,
a second electrode located on the photoelectric converter,
a first transistor configured to cause the electric charge accumulator to output the electric charge accumulated in the electric charge accumulator,
a second transistor configured to erase the electric charge accumulated in the electric charge accumulator from the electric charge accumulator, and
a third transistor configured to select any pixel from the plurality of pixels, and the photoelectric converter is an organic film.

8. A flame detection method comprising:
a determination step of, when image processing performed on image data detects ultraviolet light, determining that a flame is a fire flame; and
an output step of outputting a determination result in the determination step,
the determination step including, when the image processing detects light within a wavelength range different from a wavelength range of the ultraviolet light, determining that the light emitting source is not the fire flame.

9. A non-transitory storage medium storing a computer program configured to cause a computer system to execute the flame detection method of claim 8.

10. A flame detection system, comprising:
a solid-state imaging device including first pixels and second pixels arranged in a two-dimensional grid pattern, the second pixels being provided with filters;
a determiner configured to
create first image data from first pixel information of the first pixels,
create second image data from second pixel information of the second pixels, and determine, based on a luminance value of each of the first image data and the second image data, that an area from which light having a first wavelength is emitted represents a fire flame; and an outputter configured to output a determination result by the determiner, wherein the determiner is configured to, when the image processing detects light within a wavelength range different from a wavelength range of the ultraviolet light, determine that the light emitting source is not the fire flame.

* * * * *